(12) United States Patent
Ott et al.

(10) Patent No.: US 8,337,946 B2
(45) Date of Patent: *Dec. 25, 2012

(54) COATED NOBLE METAL ELEMENTS FOR GLASS PRODUCTION

(75) Inventors: Franz Ott, Mitterteich (DE); Dirk Gohlke, Mainz (DE); Joerg Witte, Pfungstadt (DE)

(73) Assignee: Schott AG, Mainz (DE)

( * ) Notice: Subject to any disclaimer, the term of this patent is extended or adjusted under 35 U.S.C. 154(b) by 138 days.

This patent is subject to a terminal disclaimer.

(21) Appl. No.: 12/269,144

(22) Filed: Nov. 12, 2008

(65) Prior Publication Data

US 2009/0056382 A1  Mar. 5, 2009

Related U.S. Application Data

(60) Continuation of application No. 11/947,391, filed on Nov. 29, 2007, now Pat. No. 7,648,732, which is a division of application No. 10/432,745, filed as application No. PCT/EP01/13938 on Nov. 29, 2001, now Pat. No. 7,338,714.

(30) Foreign Application Priority Data

Nov. 30, 2000 (DE) .................................. 100 59 581

(51) Int. Cl.
*B05D 1/02* (2006.01)
*B05D 3/00* (2006.01)
*B05D 1/08* (2006.01)

(52) U.S. Cl. ............. 427/193; 65/157; 65/346; 65/374.1

(58) Field of Classification Search ........................ None
See application file for complete search history.

(56) References Cited

U.S. PATENT DOCUMENTS

| 2,947,114 | A | * | 8/1960 | Hill | .................................. 432/264 |
|---|---|---|---|---|---|
| 3,109,045 | A | * | 10/1963 | Silverman | ........................ 373/30 |
| 3,360,354 | A | * | 12/1967 | Bates | .............................. 65/184 |
| 3,784,384 | A | * | 1/1974 | Webb | ................................ 501/21 |
| 4,247,320 | A | * | 1/1981 | Bansal et al. | ................. 65/134.7 |
| 4,532,184 | A | * | 7/1985 | Schuster | ......................... 428/433 |
| 4,627,864 | A | * | 12/1986 | Bhatti | .......................... 228/235.1 |
| 4,957,525 | A | * | 9/1990 | Gaertner et al. | ................. 65/493 |
| 4,961,025 | A | * | 10/1990 | Thomas et al. | ................. 313/524 |
| 5,749,932 | A | * | 5/1998 | Lamar et al. | ................. 65/135.7 |
| 5,785,726 | A | * | 7/1998 | Dorfeld et al. | ............... 65/134.1 |
| 5,879,427 | A | * | 3/1999 | Palamara | ......................... 65/499 |

(Continued)

OTHER PUBLICATIONS

Dynamic-Ceramic, "Materials" as viewed at http://www.dynacer.com/coatings.htm copyright 2006.*

*Primary Examiner* — Jodi C Franklin
(74) *Attorney, Agent, or Firm* — Michael J. Striker (57) ABSTRACT

The regionally coated noble metal element used in glass production has an uncoated region for contacting a glass melt and an $H_2$-impervious layer or an $H_2$-impervious and $O_2$-impervious layer on a side opposite from the uncoated region, which has a layer thickness $\geq 1$ mm, is heat-resistant, and is either liquid or solid. This layer is made from at least one glass or glass mixture, an at least partly crystallized glass or a ceramic material. The coated noble metal element can be a Danner channel, a Vello draw head, an A-draw head, a Vello needle, a drawdown needle, a discharge ring or a Danner blowpipe. A process for coating a noble metal element to produce the regionally coated noble metal element is also described.

8 Claims, 2 Drawing Sheets

U.S. PATENT DOCUMENTS

| | | |
|---|---|---|
| 6,176,103 B1 * | 1/2001 | Scott et al. ................... 65/121 |
| 6,629,437 B1 * | 10/2003 | Baucke et al. ............... 65/134.9 |
| 6,993,936 B2 * | 2/2006 | Grzesik et al. .............. 65/134.9 |
| 7,032,412 B2 * | 4/2006 | Dorfeld et al. .................. 65/53 |
| 7,338,714 B2 * | 3/2008 | Ott et al. ....................... 428/433 |
| 7,648,732 B2 * | 1/2010 | Ott et al. ....................... 427/193 |
| 2002/0026811 A1 * | 3/2002 | Hoyer et al. ................. 65/29.12 |
| 2003/0037572 A1 * | 2/2003 | Dick et al. ................... 65/134.9 |
| 2003/0196453 A1 * | 10/2003 | Roth et al. ................... 65/29.12 |
| 2005/0050923 A1 * | 3/2005 | Grzesik et al. .............. 65/135.6 |
| 2009/0056382 A1 * | 3/2009 | Ott et al. ..................... 65/374.12 |

\* cited by examiner

COATED NOBLE METAL ELEMENTS FOR GLASS PRODUCTION

CROSS-REFERENCE

This is a continuation, filed under 35 U.S.C. 120, of U.S. patent application Ser. No. 11/947,391, filed Nov. 29, 2007, now U.S. Pat. No. 7,648,732, which, in turn, is a divisional of U.S. patent application Ser. No. 10/432,745, filed Nov. 3, 2003 (now issued as U.S. Pat. No. 7,338,714 B2) which is the U.S. National stage of PCT/EP 01/13938, filed Nov. 29, 2001 in Europe, which, in turn, claims priority of invention based on German Patent Application 100 59 581, filed Nov. 30, 2000 in Germany.

BACKGROUND OF THE INVENTION

1. The Field of the Invention

The invention relates to coated metal elements in glass production, to a process for coating metal elements, particularly metal elements which on one side come in contact with molten glass, and to uses of such coated metal elements in the production and processing of glass.

2. The Description of the Related Art

In the glass-processing industry, containers, means of transport and tools for the handling of glass melts in the production and finishing areas are in many cases made of noble metals of the platinum group (platinum, palladium, rhodium, iridium) or of alloys of these metals with one another or with gold because of their heat-resistance and oxidation resistance. In systems for which this appears reasonable, the surfaces coming in contact with molten glass are coated with a metal of the indicated kind or are covered with a lining made of such a metal. An example of this is a feeder channel provided with a platinum lining which channel constitutes part of a glass-melting system and is usually needed for transporting liquid glass from a melting unit to a processing unit and to glass conditioning.

Molten glass always contains a certain amount of water stemming from the raw materials used for the glass melt, materials which bring the water bound therein into the manufacturing process. The atmosphere surrounding the glass melt and the water it contains, however, must also be taken into consideration. This is true particularly for water-rich furnace atmospheres in oxyfuel-fired melting tanks in which the water contained in the glass can be up to 50% higher than that in tanks that are not oxyfuel-fired.

Depending on the actually prevailing temperature, a certain percentage of the water contained in a glass melt dissociates in contact with a platinum metal forming hydrogen and oxygen. Another reason for water dissociation is based on electrolysis induced by an electric current flowing through the glass. An electric current is introduced into glass, for example, when the glass is heated with electrodes. Whereas hydrogen can diffuse through platinum metals, the oxygen generated in glass cannot. As a result of $H_2$ diffusion and the attendant drop in $H_2$ concentration in the glass, water dissociation reaches equilibrium. The hydrogen that has diffused through the metal is carried away by the air. The oxygen accumulates at the interface with the platinum until the $O_2$ concentration has exceeded the solubility limit at an $O_2$ partial pressure of about 1 bar and $O_2$-containing bubbles are formed. The bubbles grow as a result of $SO_2$, $N_2$, $CO_2$ and other gases physically dissolved in the glass diffusing into them. They are then carried away by the glass stream and end up in the finished product. This can have a very deleterious effect on the quality of the glass products made.

This affects, in particular, borosilicate glasses, aluminosilicate glasses and glass ceramics. Among the borosilicate glasses, the neutral glasses of importance in pharmacy, industry and chemistry, but also many other borosilicate glasses not belonging to the group of neutral glasses have a particularly pronounced tendency to form $O_2$ bubbles. Among the aluminosilicate glasses, particularly affected are those used for display applications and for lamps exposed to high heat. Moreover, all glasses not containing a sufficiently high concentration of polyvalent ions and which have not been adequately fined have a tendency to form $O_2$ bubbles at platinum surfaces.

It is known from U.S. Pat. No. 5,785,726 that containers made of platinum or a platinum alloy can be protected from the formation of electrochemically generated $O_2$ bubbles by flushing with a hydrogen-containing or water vapor-containing atmosphere.

It is known from WO 98/18731 to prevent bubble formation in the contact zone between the glass melt and platinum or molybdenum by providing $H_2$ on the side facing away from the glass melt. The $H_2$ partial pressure from the outside prevents $H_2$ from diffusing from the melt through the platinum.

The known processes are expensive. They must be supervised and controlled. Disturbances in the control or regulation of the gas supply cause production outages.

In U.S. Pat. No. 3,109,045 is described a crucible made of molybdenum, tungsten, platinum, iron or a resistance alloy and used for melting and fining glass made from mixtures. The crucible is immersed into the liquid glass to prevent admission of air and is thus protected from atmospheric attack and oxidation. This is a method enabling the use of melting crucibles made of refractory metals such as, for example, molybdenum and tungsten which are not oxidation-resistant. Such a system is suitable for the melting of high-temperature glasses and high-silica glasses with low thermal expansion. This system, however, can also be used for the melting of glasses having a low melting temperature.

SUMMARY OF THE INVENTION

The object of the invention is to provide a metal element made of a noble metal for the production of glass at which element the formation of $O_2$ bubbles can be effectively prevented. In particular, the object of the present invention is to provide equipment and devices made of noble metals for use in the conditioning, homogenization, distribution, heating, or shaping of molten glass. Another object of the invention is to provide a process for producing glass whereby the formation of $O_2$ bubbles can be effectively prevented.

The objectives of the present invention are reached by using a coated metal element in the production of glass, said metal element on its side facing away from the glass melt being provided with a layer that is impervious to $H_2$ or to $H_2$ and $O_2$.

Noble metals of the platinum group or the alloys thereof are oxidation-resistant even at high temperatures. Their use for such applications is known from the prior art. Such systems—provided they are used for transporting liquid glass—are usually embedded in ceramic insulating material and with the aid of ceramic mortars and grout. In equipment for shaping molten glass, a core—for example a shaft for a tube-drawing needle or a cylinder for a Danner blowpipe—which consists partly or entirely of ceramic material, is coated with a noble metal.

It is advantageous to provide such equipment made of a platinum metal with a layer impervious to $H_2$ or to $H_2$ and $O_2$. This is intended to prevent not the oxidation of the platinum metal, but the diffusion of hydrogen generated by the process of water dissociation in the glass at the noble metal-glass interface.

The $H_2$-impervious or $H_2$ and $O_2$-impervious layer according to the invention is heat-resistant as well as liquid or solid. For purposes of the present invention, the expression $H_2$-impervious or $H_2$ and $O_2$-impervious means that the imbalance between the $H_2$ and $O_2$ gases dissolved in the glass melt or the ions thereof can, as a result of $H_2$ diffusion through the layer, become only so high as to keep the $O_2$ partial pressure below the solubility limit of $O_2$ so that no $O_2$-containing bubbles are formed at the glass melt/metal interface.

A preferred embodiment of the invention is a coated metal element wherein the $H_2$-impervious or $H_2$ and $O_2$-impervious layer contains at least one glass or glass mixture or a partly or entirely crystallized glass or a ceramic material.

A preferred embodiment of the invention is a coated metal element wherein the $H_2$-impervious or $H_2$ and $O_2$-impervious layer contains at least one glass having the following composition:

| | |
|---|---|
| $SiO_2$ | 40 to 99 wt. % |
| $Al_2O_3$ | 1 to 30 wt. % |
| $B_2O_3$ | 0 to 30 wt. % |
| BaO | 0 to 15 wt. % |
| CaO | 0 to 20 wt. % |
| MgO | 0 to 8 wt. % |
| $ZrO_2$ | 0 to 5 wt. % |
| $\Sigma R_2O$ | 0 to 25 wt. % |
| $P_2O_5$ | 0 to 10 wt. % |
| $Cr_2O_3$ | 0 to 3 wt. % |
| $TiO_2$ | 0 to 10 wt. % |
| $Fe_2O_3$ | 0 to 10 wt. % |
| ZnO | 0 to 5 wt. % |
| MnO | 0 to 10 wt. % |
| SrO | 0 to 10 wt. % |
| PbO | 0 to 70 wt. % |
| Fluorine | 0 to 1 wt. %. |

Moreover, the glass can contain other components such as, for example, $Sb_2O_3$, $As_2O_3$, $Cl^-$, $SO_3$, oxides of the rare earth elements, coloring oxides of the subgroup elements and other components present in glass.

$\Sigma R_2O$ is the sum of all alkali metal oxides, particularly the sum of $Li_2O$, $Na_2O$, $K_2O$ and $Cs_2O$.

Another preferred embodiment of the invention is a coated metal element wherein the $H_2$-impervious or $H_2$ and $O_2$-impervious layer contains at least one glass having the following composition:

| | |
|---|---|
| $SiO_2$ | 55 to 70 wt. % |
| $Al_2O_3$ | 10 to 30 wt. % |
| $B_2O_3$ | 0 to 15 wt. % |
| BaO | 5 to 15 wt. % |
| CaO | 3 to 15 wt. % |
| MgO | 0 to 8 wt. % |
| SrO | 0 to 10 wt. % |
| $ZrO_2$ | 0 to 2 wt. % |
| $\Sigma R_2O$ | 0 to 5 wt. % |
| $P_2O_5$ | 0 to 10 wt. % |
| $Cr_2O_3$ | 0 to 1 wt. % |
| $TiO_2$ | 0 to 1 wt. % |
| $Fe_2O_3$ | 0 to 1 wt. % |
| ZnO | 0 to 1 wt. %. |

Another preferred embodiment of the invention is a coated metal element in which the $H_2$-impervious layer or $H_2$ and $O_2$-impervious layer contains at least one glass having the following composition:

| | |
|---|---|
| $SiO_2$ | 70 to 85 wt. % |
| $Al_2O_3$ | 1 to 8 wt. % |
| $B_2O_3$ | 5 to 25 wt. % |
| BaO | 0 to 5 wt. % |
| CaO | 0 to 3 wt. % |
| MgO | 0 to 3 wt. % |
| $ZrO_2$ | 0 to 2 wt. % |
| $\Sigma R_2O$ | 3 to 15 wt. % |
| $P_2O_5$ | 0 to 2 wt. % |
| $Cr_2O_3$ | 0 to 2 wt. % |
| $TiO_2$ | 0 to 6 wt. % |
| MnO | 0 to 6 wt. % |
| $Fe_2O_3$ | 0 to 5 wt. % |
| ZnO | 0 to 2 wt. % |
| Fluorine | 0 to 0.5 wt. %. |

Another preferred embodiment of the invention is a coated metal element in which the $H_2$-impervious layer or $H_2$ and $O_2$-impervious layer contains at least one glass having the following composition:

| | |
|---|---|
| $SiO_2$ | 65 to 75 wt. % |
| $Al_2O_3$ | 2 to 6 wt. % |
| $B_2O_3$ | 0 to 3 wt. % |
| BaO | 0 to 5 wt. % |
| CaO | 2 to 7 wt. % |
| MgO | 0 to 5 wt. % |
| $ZrO_2$ | 0 to 1 wt. % |
| $\Sigma R_2O$ | 10 to 20 wt. % |
| $P_2O_5$ | 0 to 5 wt. % |
| $Cr_2O_3$ | 0 to 1 wt. % |
| $TiO_2$ | 0 to 1 wt. % |
| $Fe_2O_3$ | 0 to 5 wt. % |
| Fluorine | 0 to 1 wt. % |
| ZnO | 0 to 1 wt. %. |

Another preferred embodiment of the invention is a coated metal element in which the $H_2$-impervious layer or $H_2$ and $O_2$-impervious layer contains at least one glass having the following composition:

| | |
|---|---|
| $SiO_2$ | 55 to 75 wt. % |
| $Al_2O_3$ | 15 to 25 wt. % |
| $B_2O_3$ | 0 to 3 wt. % |
| BaO | 0 to 5 wt. % |
| ZnO | 0 to 3 wt. % |
| MgO | 0 to 2 wt. % |
| $ZrO_2$ | 0 to 3 wt. % |
| $\Sigma R_2O$ | 1 to 7 wt. % |
| $P_2O_5$ | 0 to 5 wt. % |
| $Cr_2O_3$ | 0 to 1 wt. % |
| $TiO_2$ | 0 to 5 wt. % |
| $Fe_2O_3$ | 0 to 5 wt. %. |

Moreover, $As_2O_3$, $Sb_2O_3$, and coloring components in an amount from 0 to 3 wt. % each can be contained in the glass.

A particularly preferred embodiment of the invention is a coated metal element wherein the $H_2$-impervious or $H_2$ and $O_2$-impervious layer consists of the same glass as the glass which is transported, conditioned, shaped or processed with the metal element coated in this manner.

A preferred embodiment of the invention is a coated metal element wherein the $H_2$-impervious or $H_2$ and $O_2$-impervious layer has a thickness of at least 0.02 mm and preferably 1 to 10 mm and even greater.

A preferred embodiment of the invention is a coated metal element wherein the material used for the $H_2$-impervious or $H_2$ and $O_2$-impervious layer has a viscosity of 10 to $10^8$ dPa·s and preferably $10^2$ to $10^6$ dPa·s.

A preferred embodiment of the invention is a coated metal element wherein the material used for the $H_2$-impervious or $H_2$ and $O_2$-impervious layer is made from crushed glass or cullet that is mixed with ground ceramic material. The ceramic particles can be coarse or finely ground, the particle size and particle size distribution being selected in accordance with the intended use.

A preferred embodiment of the invention is a coated metal element wherein the $H_2$-impervious or $H_2$ and $O_2$-impervious layer consists of a ceramic material mixed with crushed glass, the crushed glass preferably having a particle size of <10 mm and particularly of <1 mm.

A preferred embodiment of the invention is a coated metal element containing at least one metal from the group consisting of rhodium, iridium, palladium and platinum and an alloy or compound with at least one of these metals or with gold or a fine grain-stabilized noble metal.

A preferred embodiment of the invention is a coated metal element that is thermally insulated with ceramic masonry and has a gap between the metal element and the ceramic material, said element being provided with one or more support elements. In this manner, the load on the coated metal element is mechanically reduced so that said element cannot undergo deformation. At the same time, this ensures that the gap will be permanently retained. Sufficiently large openings are provided between the support elements to allow unhindered flow of the coating medium, for example glass, and to allow the air to escape.

The support elements can be made of metal or ceramic material. The ceramic material is the same as that usually employed in the glass industry as insulating material or material for the construction of tanks and which has a sufficiently high heat resistance. Particularly suitable for this purpose are commercial grades of ceramic material intended for contact with molten glass. The metallic support elements consist of a heat-resistant metal and preferably of the same metal as the structural component to be coated.

This sealing of the "backside" of the metal element facing away from the glass melt, which metal element on one side is in contact with the glass melt, with a layer that reduces the $H_2$ permeability or $H_2$ and $O_2$ permeability and that consists of a meltable or partly or entirely crystallized material or of a ceramic material, reduces the diffusion of hydrogen through the metal element from the side in contact with the glass melt to the backside of the metal element, namely the side that faces away from the glass melt. On the other hand, the sealing thus brought about prevents the atmospheric oxygen present in the atmosphere surrounding the backside of the metal element from coming in contact with the metal element, reacting with the hydrogen that is diffusing out and forming water. The seal indirectly enables the elementary reactions bringing about water dissociation and which take place in the glass melt/metal element contact zone to reach a state of equilibrium. This is due to the fact that after a certain enrichment of the metal element with hydrogen, hydrogen is no longer removed from the glass melt/metal element reaction zone, and water dissociation comes to an end.

The composition of the glass used to coat the noble metal is selected on the basis of different criteria. Basically, it is particularly advantageous if the composition of the contacting glass that is to be processed and of the glass used to coat and seal against hydrogen diffusion are identical or at least similar. Coating glasses with a basicity that differs markedly from that of the glass to be processed are to be avoided. Under such conditions, as a result of electrochemical effects, new bubbles can be formed on the platinum or the platinum alloy and end up in the product.

Particularly suitable are process variants wherein the applied protective layer is elastic. In the most advantageous case, the process of the invention should hermetically seal the metal element. Ideally, this can be accomplished by means of an elastic protective layer which within certain limits follows the thermal expansions and compressions of the metal element bearing said layer.

Metal elements used in the glass-processing industry, in particular, must be assumed to undergo frequent temperature changes and attendant thermal expansions. The selection of the material to be used for the protective layer is therefore particularly important if the objective of the invention is to be reached in optimum fashion.

Advantageous are processes whereby the metal element provided with a protective layer is covered with a ceramic material or the metal element coated with a protective layer is embedded in ceramic masonry or thermal insulation.

In accordance with a variant of the invention, the glass, glass solder, composite glass or glass ceramics used for the protective layer have a liquid us temperature that is higher than the operating temperature of the metal element to be coated.

The crystallizing layers then at first consist of liquid glass the liquidus temperature of which, as stated previously, is above the operating temperature of the metal element so that after days or weeks a partly or entirely crystalline glass body is formed which confers additional stability to the metal element. If during the use of a metal element coated or enveloped in this manner cracks caused by mechanical stress or other factors appear in the covering, these cracks will be repaired within a short time because of the still partly present glass phase so that the desired long-term gas impermeability of the protective layer will remain preserved to the highest possible degree. The fluid glass phase in this case covers the open spots of the damaged protective layer thus repairing the cracks.

The material, however, can also have a liquidus temperature that is below the operating temperature so that in this case the metal element must be able to retain its shape. This variant has the advantage that the metal elements are always sealed by liquid glass. It is also necessary to ensure, however, that the liquid protective layer does not attack the thermal insulation made of ceramic material that may be in direct contact with it so strongly that the insulating action and the protective function of the ceramic material are negatively affected. This can be avoided by appropriate selection of the coating and insulating materials.

The operating temperature of the metal element to be coated and the temperature-dependent properties of the glass constituting the protective layer should preferably be adapted to each other. For structural components that are not involved in processing, the protective layer does not necessarily have to bring about an ideally gas-tight, hermetic sealing of the metal element. What is critical is only that when the structural component is used as directed or is possibly subjected to an additional heat treatment, the applied protective layer performs the task for which it is intended according to the invention and form an essentially gas-tight protective layer.

Recommended is the process in which the applied protective layer has a thickness of at least 0.02 mm and preferably from 1 to 10 mm. Preferred are process variants in which the material used has a viscosity from 10 to $10^8$ dPa·s and preferably from $10^2$ to $10^6$ dPa·s. The reason behind this special process characteristic is that the viscosity of the glass in which the formation of $O_2$ bubbles must be prevented is as a rule in the range from 10 to $10^8$ dPa·s and particularly from $10^2$ to $10^6$ dpa·s, and that the material chosen for sealing preferably should have the same viscosity. Another reason for this is that the coating material must neither be too fluid nor too viscous. On the one hand, the metal must be completely wetted by the glass constituting the coating, so that it is necessary for the glass to be so fluid that, to be able to perform the sealing, it flows on the metal element forming a closed protective layer. On the other hand, however, the glass must not be too fluid so that it will pass through any joints or gaps of a possibly present insulation material or that because of its low viscosity it will, for example, dissolve or damage any ceramic insulation that may be present.

According to the invention, very good results in terms of reducing bubble formation are obtained when the glass used for the $H_2$-impervious or $H_2$ and $O_2$-impervious layer is the same as the glass melt which by means of this metal element is transported, conditioned or processed and shaped into a finished product.

Recommended is a process variant whereby the metal element to be coated is provided on the side to be coated with an insulating jacket in a manner such that an empty space or gap is formed between the surface to be coated and the insulating jacket. The empty space thus formed is filled with the coating material. By applying a sufficiently high temperature the material is made to melt so that the resulting viscous material completely wets the surface to be coated forming a protective layer.

An advantageous process is the one in which an empty space is formed between the insulation and the surface to be coated, the gap being between 1 and 10 mm wide. The width of this gap can also be greater, depending on the application. Usually, the empty space is filled with cullet, crushed glass or glass powder which at a sufficiently high temperature melts and wets the metal element from the outside with liquid glass which can later crystallize. During the melting, more cullet or ground glass is added until the empty space is full and the metal element is completely wetted with glass.

In terms of its thermal expansion, the material used for the protective layer in this process is adapted as much as possible to the material constituting the metal element to be coated.

Notable is also a process variant whereby the protective layer is applied by spreading a pasty material, which after it is applied to the surface to be coated is subjected to heat high enough to cause the formation of a glassy, essentially gas-tight glaze. The protective layer thus formed can remain glassy and viscous or partly or completely crystalline, depending on the composition of the pasty material selected. The pasty material can also be mixed with crushed glass or glass powder so that after heat treatment a glass layer is formed.

Particularly recommended is a process variant whereby crushed glass preferably having a particle size of <1 mm is blended with a ceramic grout composition, and the resulting mixture is applied to the surface of the metal element to be coated. In this manner, the grout composition forms a solid support structure for the coated metal, and the ground glass takes over the sealing function in that it fills the empty space and closes the open pores of the ceramic grout composition. Preferably, the crushed glass used for the protective layer is blended with the ceramic grout composition in a ratio from 20:1 to 1:20 and particularly from 10:1 to 1:10.

Preferably used are the types of glass that do not attack and/or melt the ceramic composition or grout composition. This ensures that the ceramic composition will retain sufficiently high strength and supporting ability. Hence, preferred are glasses containing only a minor amount of flux or possibly devoid of flux altogether. In this respect, fluxes include, among others components, fluorine or the oxides of boron and of alkali metals.

Particularly preferred as contact materials or as additives to the glasses used for coating the metal elements are the types of ceramics and fire-resistant materials used as linings for glass-melting tanks. These materials resist in optimum manner and to the highest degree possible not only high temperatures but also attack by molten glasses. Particularly well suited to this end are ceramic or melt-cast fire-resistant materials based on $SiO_2$, $ZrO_2$ and $Al_2O_3$ alone or in combination with one another. Melt-cast fire-resistant stones of this kind are known and marketed, for example, as AZS or high-zirconium stones or as zirconium silicate. They can also contain MgO, CaO, $P_2O_5$, $Fe_2O_3$, $TiO_2$, $Cr_2O_3$ and other components. In particular, melt-cast materials are very dense and free of open pores.

It is possible to add to the crushed glass used to fill the gap between the metal element and the insulation and to form the $H_2$-impervious or $H_2$ and $O_2$-impervious coating more or less coarsely ground particles and grit of these materials without running the risk that they will be dissolved by the glass. The solid ceramic or melt-cast constituents of this coating confer to the coated metal element firmness and support particularly when the particle size distribution of these solid constituents is selected so that the diameter of the largest particles of the grit is exactly as large as the gap between the metal element and the insulation.

The table I below lists several examples of the compositions of the materials used according to the invention, the data being expressed in weight percent (wt. %):

|  | Glass 1 | Glass 2 | Glass 3 | Glass 4 | Glass 5 | Grout 1 | Grout 2 | Ceramic material 1 | Ceramic material 2 | Ceramic material 3 |
|---|---|---|---|---|---|---|---|---|---|---|
| $SiO_2$ | 60 | 61 | 81 | 75 | 69 | 0.5 | 100 | 54 | 15-100 | 1-100 |
| $Al_2O_3$ | 14 | 16.5 | 2 | 5.3 | 4 | 95 | — | 31 | 0-75 | 0-95 |
| $B_2O_3$ | 4.5 | 0.5 | 13 | 10.5 | 1 | — | — | — | — | — |
| BaO | 9 | 8 | — | 0.6 | 2 | — | — | — | — | — |
| CaO | 10 | 13 | — | 1.4 | 5 | 4 | — | — | <1 | — |
| MgO | 2.5 | <0.5 | — | — | 3 | — | — | 1 | 0-5 | — |
| $ZrO_2$ | — | 1 | — | — | — | — | — | — | — | 0-99 |
| $\Sigma R_2O$ | <0.1 | <0.1 | 4 | 7 | 16 | 0.5 | — | 2 | 0-2 | — |
| $P_2O_5$ | — | — | — | — | — | — | — | — | — | 0-5 |
| $Cr_2O_3$ | — | — | — | — | — | — | — | — | — | 0-0.95 |
| $TiO_2$ | — | — | — | — | — | — | — | 1 | 0-2 | 0-3 |
| $Fe_2O_3$ | — | — | — | — | — | — | — | 1 | 0-2 | 0-3. |
| F | — | — | — | 0.2 | — | — | — | — | — | — |

The viscosity of the glasses chosen as additives to the ceramic material is preferably adapted to the operating temperature of the structural component to be coated so that the added glass constituents will melt and wet said component thus ensuring reliable sealing.

Advantageous are processes whereby the ceramic composition used for the protective layer is supplemented by addition of cullet, crushed glass or glass powder, and this mixture is applied to the surface to be coated of the metal element to be coated.

According to another process variant, cullet or crushed glass is wound around the metal element to be coated with the aid of a pad of ceramic insulating fibers and thus brought in contact with the surface to be coated. By applying a sufficiently high temperature, the cullet or crushed glass thus positioned between the insulating pad and the surface to be coated is sintered and on melting wets the metal thus forming a closed protective layer.

According to the invention, the $H_2$-impervious or $H_2$ and $O_2$-impervious layer for coating metal elements coming in contact with molten glass is intended for use on platinum electrodes in distributors, channels or melting tanks, pipes for conveying and conditioning glass melts, such as feeding channels and Danner channels, Vello draw heads and A-draw heads, shaping tools for producing pipes and rods, such as Vello needles, drawdown needles, discharge rings and platinum-lined Danner blowpipes, jacketed platinum tubes for direct heating of bottom outlets, transport equipment or charging organs, agitators, pipe-drawing heads, feeder heads, plungers in gob feeders, drawing tanks and drawing lips for flat glass production and fining chambers that are installed downstream from melting equipment.

According to the invention, the coated metal elements are used in glass melting, glass transportation, glass conditioning, glass homogenization and glass processing or shaping.

BRIEF DESCRIPTION OF THE DRAWING

The objects, features and advantages of the inventive device will now be illustrated in more detail with the aid of the following description of the preferred embodiments, with reference to the accompanying figures in which.

DETAILED DESCRIPTION OF THE INVENTION

Figure 1:
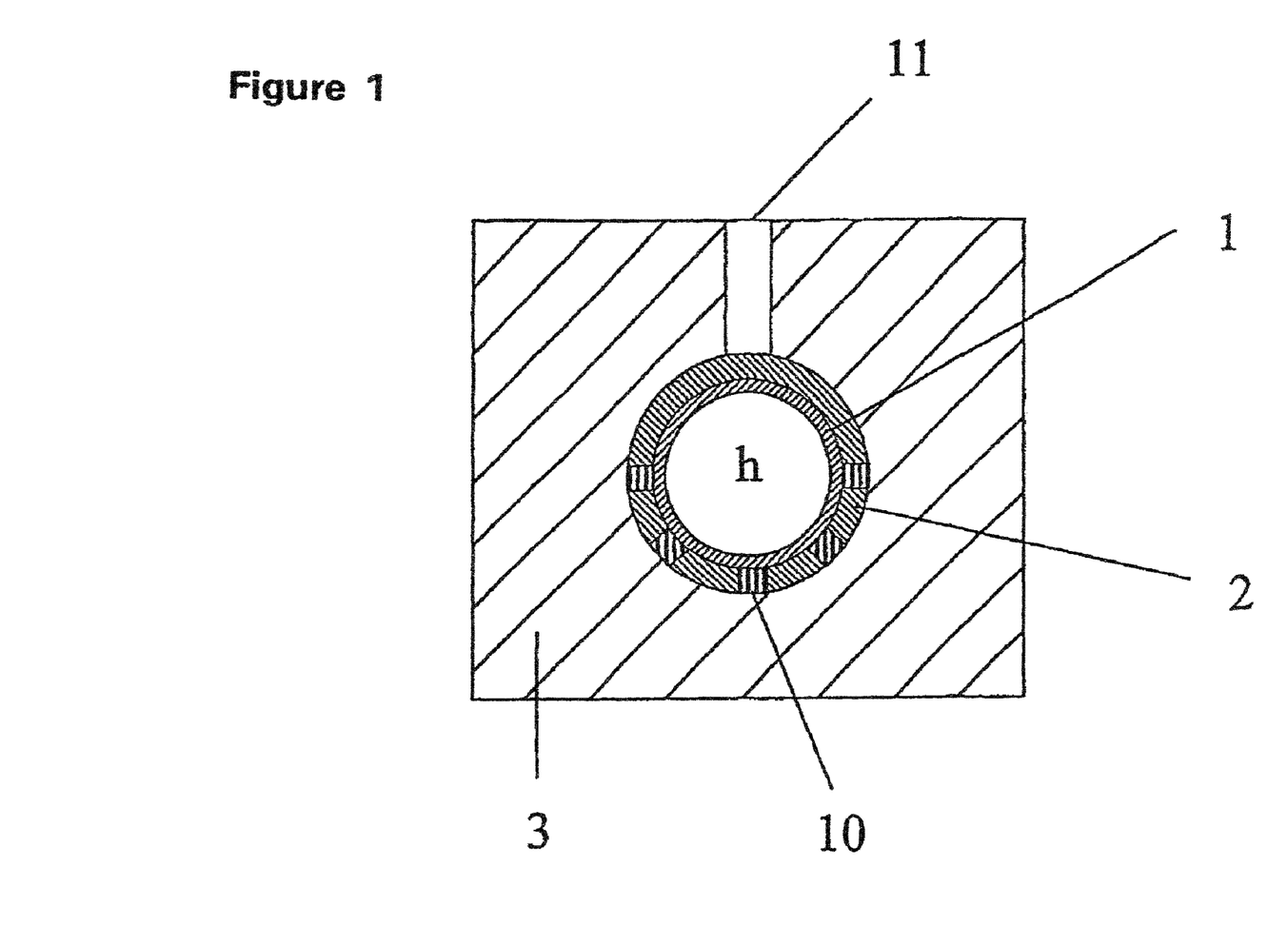
FIG. 1 is cross-sectional view through a glass-conveying platinum pipe provided with a protective layer, in particular a cross-section through a Danner channel with support elements.

FIG. 1 shows a glass-conveying platinum pipe 1 in cross-section. The glass-conveying platinum pipe 1 preferably has been provided, by means of one of the afore-described process variants, with a protective layer 2 that fills an empty space between the outer surface of the platinum pipe 1 and insulation 3 surrounding the pipe. The entire structural component consisting of the glass-conveying platinum pipe 1 with the protective layer 2 applied thereon is embedded in insulation 3 consisting of ceramic material. This insulation 3 as a rule consists of masonry, which provides heat insulation 3 in addition to its supporting function.

What is shown, in particular, is a Danner channel 1 with support elements 10. The Danner channel 1 has several support elements 10. The support elements 10 are arranged between the Danner channel 1 and the insulation 3. Sufficiently large openings are provided between the support elements 10, so that the glass flow is unhindered and air can escape. The support elements 10 can consist of metal or ceramic material. Finally, the figure shows a filling port 11 for the glass used for coating.

Figure 2:
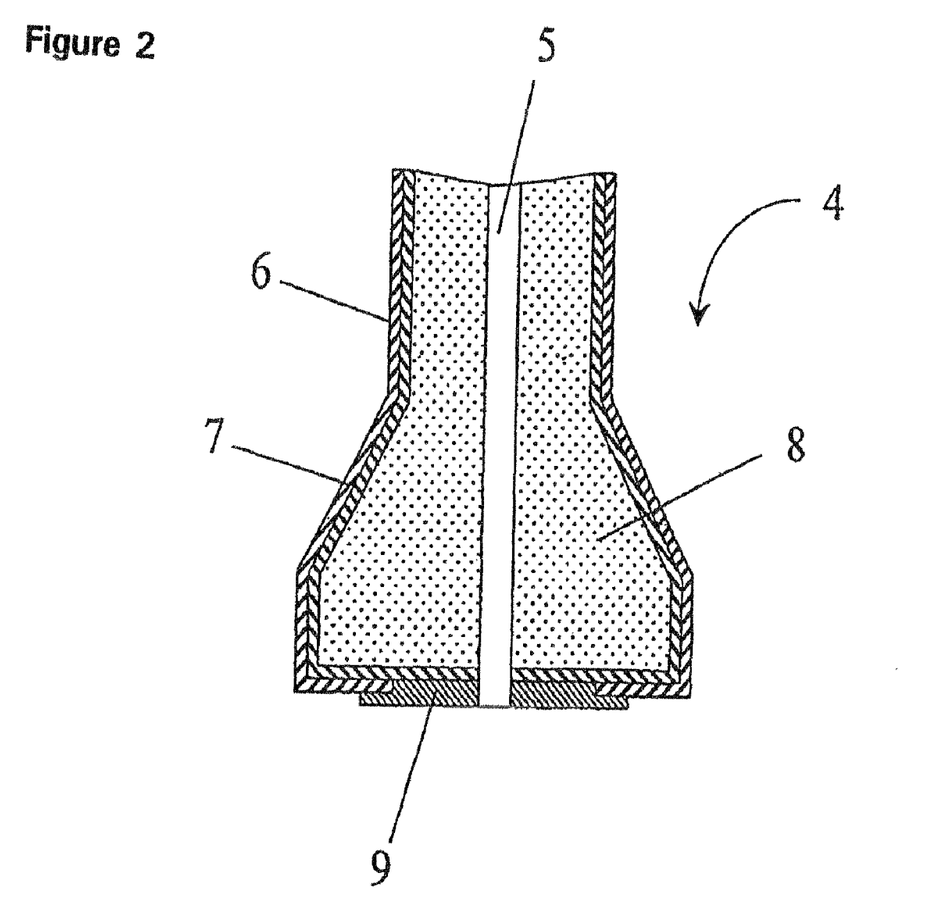
FIG. 2 is a longitudinal cross-sectional view of a Vello needle according to the invention.

FIG. 2 shows a Vello needle 4 in longitudinal cross-section. To the shaft and the core 8, in the middle of which is disposed a channel for blowing in air 5, has been applied, by use of one of the afore-described process variants, an essentially gas-tight protective layer 7 on which, in turn, rests the platinum lining 6 known from conventional Vello needles 4. The Vello needle 4 is an example of a structural component exposed externally to a glass melt. Hence, unlike the glass-conveying platinum pipe 1 shown in FIG. 1, this structural component is not provided with a protective layer 2 externally, but on the inside which in the case of the Vello needle 4 represents the side facing away from the surface exposed to the glass melt and thus is the side to be coated. At its end, the Vello needle 4 is provided with a seal 9 to prevent the more or less viscous protective layer 7 from escaping.

As already mentioned, in the production of the Vello needle 4, the protective layer is first applied to the shaft and the core 8. In any case, in doing so, it is necessary to ensure that, following a heat treatment or during use of the Vello needle 4, the platinum lining 6 resting on the protective layer 7 is wetted and enveloped and thus essentially sealed in gas-tight manner by the protective layer 7 in that the layer melts or has the fluidity required for wetting the platinum lining 6.

EXAMPLES

Set-up

In a Danner channel made of a platinum alloy and having a diameter of 110 mm, glass No. 4 (see table) was conditioned at a temperature of 1250° C. for the tube-drawing process. The platinum channel was heat-insulated with a $SiO_2$-ceramic material and embedded so that a gap of about 1 cm existed around the platinum pipe, the lower half of said platinum pipe being supported by many small ceramic spacers.

Comparative Example 1

Platinum Pipe with Admission of Air

The outside of the glass-conveying platinum pipe was first exposed to air. Sorting based on quality criteria resulted in approximately 40% production waste caused by the presence of bubbles. To be able to determine the nature of the gas contained in the bubbles, glass samples were taken at the outlet from the Danner channel, the bubbles contained therein were cut out in the laboratory and then broken open in a gas chromatograph. The composition of the gas contained in the bubbles was determined. The contents of most bubbles consisted of pure $O_2$. This is an unequivocal indication that these bubbles were formed electrochemically at the platinum/glass melt interface and could have been only a few minutes old. Otherwise, other gases, for example $SO_2$, $N_2$ or $CO_2$ would also have been detected.

Comparative Example 2

Platinum Pipe with Hydrogen

By introducing a weak forming gas consisting of $N_2$ and very little $H_2$, as described in U.S. Pat. No. 5,785,726, the formation of $O_2$-containing bubbles at the interface with the platinum was effectively suppressed. Glass samples taken at the outlet of the Danner channel contained no bubbles with 100% oxygen. Found were only bubbles the contents of which indicated that they had been formed in the melting tank and were not completely removed from the glass during fining. In essence, these bubbles contained $SO_2$, $N_2$ and $CO_2$. The production waste caused by bubbles was reduced to a normal proportion of 3-5%.

This process has the drawback that it cannot be run without supervision and that it is uneconomical. The $H_2$ partial pressure in the flushing gas must be permanently determined by measuring the redox potential at the platinum and must be controlled via the $H_2$ partial pressure in the flushing gas. Otherwise, the danger exists that the $O_2$-reducing action in the glass will not be sufficient to suppress the electrochemically formed $O_2$ bubbles or that, as a result of over-reduction, the platinum will be damaged and embrittled, which would require rebuilding the platinum Danner channel.

Comparative Example 3

Platinum Pipe with Water Vapor

In a second test, $H_2O$ vapor-containing air was fed through gap 2 (FIG. 1) between platinum 1 and ceramic insulation 3, the air stream having been passed through a water container heated to 70° C. which enriched said stream in water vapor. By this process, the production waste due to bubbles was reduced to about 5% and the electrochemical generation of $O_2$ bubbles was effectively suppressed. This process, however, also has the drawback that it is not supervision-free and the $H_2O$ partial pressure in the flushing gas must be controlled.

Example

Platinum Pipe with a Glass Coating

In a third test, in the same Danner channel, the empty space around the platinum pipe was first flushed with air devoid of $H_2$ or $H_2O$ vapor. $O_2$-containing bubbles formed immediately at the platinum/glass melt interface, which led to a rapid increase in production waste caused by bubbles, as in comparative example 1. Thereafter, the platinum Danner channel was sealed according to the present invention with a 1 cm-thick glass coating. The coating was carried out by introducing cullet of glass No. 4 through several openings in the ceramic insulation provided expressly for this purpose. At the operating temperature of 1250° C., the cullet melted immediately and the resulting glass melt spread out in empty space 2 between the platinum pipe and the ceramic insulation while the air escaped through the feeding port. Cullet was fed until the empty space around the platinum pipe was full and the outside of the platinum pipe was completely wetted with glass and a 1 cm-thick glass layer had formed. The production waste was immediately reduced to 3-5% and was caused only by bubbles entrained from the tank. Once again, the glass product formed had no $O_2$-containing bubbles, as established by gas-chromatographic analysis of the gas contents of a representative number of bubbles.

The platinum Danner channel thus coated was used continuously over a period of two weeks. This unequivocally demonstrates the reliable action of the coating.

This process no longer shows the drawbacks of the two afore-described methods involving flushing with a weak forming gas or with $H_2O$ vapor-enriched air. The advantage of the device according to the invention is that it is entirely supervision-free, requires no control, is safe for the platinum, causes no process costs and reliably suppresses the formation of $O_2$-containing bubbles. By the 1 cm-thick glass layer surrounding the platinum pipe, the diffusion through the platinum of $H_2$ from the glass transported in the platinum pipe was entirely prevented, and the electrochemical dissociation of water in the glass was effectively suppressed. The device according to the invention is used very advantageously in the process of the invention.

While the invention has been illustrated and described as embodied in coated noble metal elements for glass production, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A device for glass melting, glass transportation, glass conditioning, glass homogenizing, glass distributing or glass shaping, said device comprising
   a noble metal element having an uncoated region for contacting a glass melt on one side thereof;
   an insulating jacket or body spaced from another side of the noble metal element opposite from said one side so as to form a gap between said insulating jacket or body and said another side;
   support elements extending between said insulating jacket or body to said noble metal element in order to support said noble metal element and maintain said gap between said insulating jacket or body and said another side; and
   an $H_2$-impervious coating or an $H_2$-impervious and $O_2$-impervious coating on said another side of the noble metal element opposite from the one side having the uncoated region coming in contact with said glass melt;
   wherein said $H_2$-impervious coating or said $H_2$-impervious and $O_2$-impervious coating has a thickness of greater than or equal to 1 mm, is heat-resistant, and is a solid or liquid that fills said gap between said insulating jacket or body and said another side; and
   wherein said liquid is molten glass and said solid comprises glass, partly crystallized glass, or ceramic material.

2. The device defined in claim 1, wherein said thickness of said $H_2$-impervious coating or said $H_2$-impervious and $O_2$-impervious coating is from 1 to 10 mm.

3. The device as defined in claim 1, wherein said noble metal element comprises at least one metal and wherein said at least one metal is rhodium, iridium, palladium or platinum, or an alloy or compound with said rhodium, said iridium, said palladium or said platinum or with gold or with a fine grain-stabilized noble metal.

4. The device as defined in claim 1, wherein said noble metal element consists of a system or device for conditioning, homogenizing, distributing, heating or shaping molten glass.

5. The device as defined in claim 1, wherein said $H_2$-impervious coating or said $H_2$-impervious and $O_2$-impervious coating consists of a coating material and said coating material comprises crushed glass or cullet mixed with melt-cast solid material or mixed with grit and particles of said melt-cast solid material.

6. The device as defined in claim 1, wherein said noble metal element consists of one of an electrode in a distributor, a channel or melting tank, a pipe for conducting and conditioning glass melts, a shaping tool for producing pipes and rods, a jacketed platinum tube for direct heating of bottom outlets, transport equipment or charging organs, an agitator, a pipe-drawing head, a feeder head, a plunger in a gob feeder, or a drawing tank or drawing lips for flat glass production and fining chambers.

7. The device as defined in claim 6, wherein said pipe for conducting and conditioning glass melts is a Danner channel, a Vello draw head or an A-draw head.

8. The device as defined in claim 6, wherein said shaping tool is a Vello needle, a drawdown needle, a discharge ring or a Danner blowpipe.

* * * * *